(No Model.)
C. POPE.
MANUFACTURE OF GLUCOSE OR SUGAR FROM STARCH.
No. 585,285. Patented June 29, 1897.
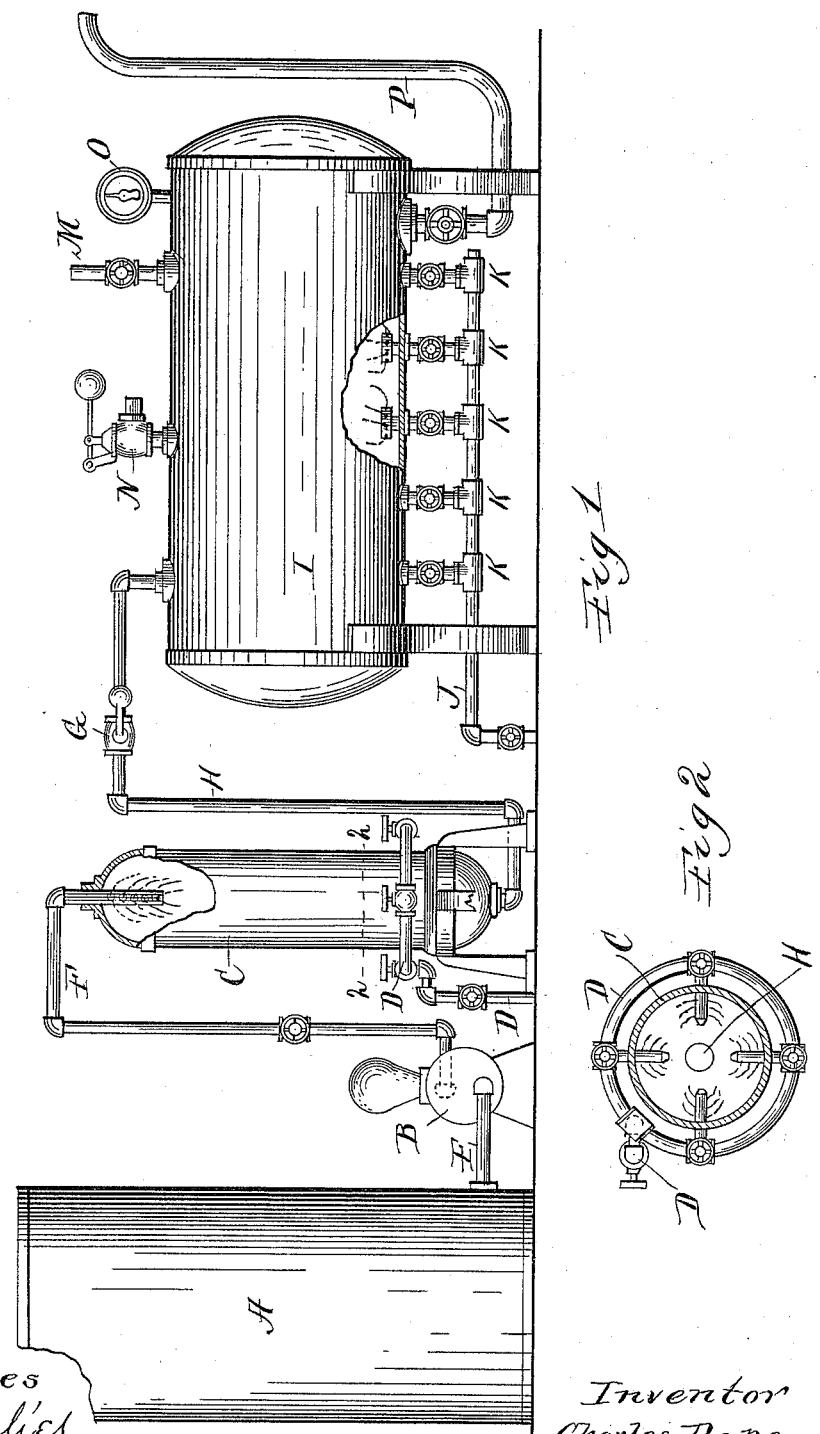
Witnesses
W. C. Colley
A. A. Murray
Inventor
Charles Pope
By Coburn & Thacher
Attys

UNITED STATES PATENT OFFICE.

CHARLES POPE, OF CHICAGO, ILLINOIS.

MANUFACTURE OF GLUCOSE OR SUGAR FROM STARCH.

SPECIFICATION forming part of Letters Patent No. 585,285, dated June 29, 1897.

Application filed September 19, 1895. Serial No. 562,977. (No specimens.)

*To all whom it may concern:*

Be it known that I, CHARLES POPE, a citizen of the United States, residing at Chicago, in the county of Cook and State of Illinois, have invented a certain new and useful Improvement in Processes for the Manufacture of Glucose or Sugar from Starch, which is fully set forth in the following specification, reference being had to the accompanying drawings, in which—

Figure 1 represents a side elevation of one form of apparatus which can be used in carrying out my process. Fig. 2 represents a sectional view of the starch-liquefier, taken at the line 2 2, looking down.

In converting starch to glucose and sugar it is very desirable to use sulfurous acid. It has been very difficult to so combine and treat starch-milk with sulfurous acid as to make a complete mixture and fully liquefy the starch. I have discovered a process by which I am enabled to accomplish this complete mixture of the two in such manner as to fully liquefy the starch by keeping the acid fully in contact with all the starch in the starch-milk until it becomes fully liquefied, whereby I prevent the formation of any paste in the starch-milk.

My process consists in first mixing the starch-milk and sulfurous acid in a liquid form in any suitable tank or vessel, such as represented by A in Fig. 1 of the accompanying drawings. From this tank or vessel it is pumped by any ordinary pump B into a vessel C, which I term the "liquefier." This vessel is heated by the admission of steam through ordinary steam-pipes D. I have shown four branch steam-pipes leading into the liquefier C. I preferably admit the steam to the liquefier near its bottom, the mixture of starch-milk and sulfurous acid being admitted to the top of the liquefier through a pipe F, which leads from the bottom B to the liquefier C. The liquefier is normally full of liquid. The mixture of starch-milk and sulfurous acid being forced into the liquefier under pressure by the pump and heated in the liquefier, the acid is made to commingle throughout the entire body of starch-milk and liquefaction of the starch immediately commences. The pressure in the liquefier is determined by a regulating-valve G, placed in a pipe H, leading from the liquefier to the converter tank or vessel I. This pressure and heat is regulated so as to substantially complete the liquefaction of the starch in the liquefier. The mixture is then forced into the converter until it is full. Then additional pressure may be added to the converter by admitting steam into the converter to complete the formation.

I have shown in the accompanying drawings a steam-pipe J, with branches K, for admitting steam into the converter. I have also shown an air-escape pipe M, through which the air is blown from the converter; also, a safety-valve N and a pressure-gage O. When the charge of mixture in the converter is sufficiently converted, it is blown out through the pipe P into any suitable receptacle for further treatment.

The operation of my process is as follows: The tank A is filled with a mixture of starch-milk and sulfurous acid. The proportion of the acid to the starch-milk may be varied, but I find in practice that one-half of one per cent. of the acid will produce complete liquefaction of the starch. This mixture of starch-milk and acid in the tank is cold, so that there is no tendency for the sulfurous acid to escape as gas or for the starch-milk to form paste. The liquefier is filled either with hot water or with cold water, which is thereupon heated from the steam-jets R, whereby all air is removed from the converter. The pump B is now set in operation and pumps the starch-and-acid mixture into the top of the liquid in the liquefier, into which it passes by the jets a, which serve to distribute the mixture in the liquid more completely than a single jet would do, and thus secure greater commingling of the starch and acid. The temperature of the liquid in the liquefier may be varied, such variation producing differences in the results. I find that a temperature of from 250° to 300° Fahrenheit gives the best results. The pressure in the liquefier will of course correspond to the temperature. As soon as the starch-and-acid mixture comes in contact with the hot liquid in the liquefier the liquefaction of the starch—that is, its conversion into its soluble form (dextrine)—commences. By the time that any given portion of the starch-and-acid mixture has been forced down toward the lower portion of the liquefier the liquefaction of the starch will be completed. As fast as the starch-and-acid mixture is pumped into the top of the liquefier the liquid in the liquefier passes out from the bottom thereof into the converter. Of course at the very commencement of the process the first liquid that passes into the converter will be approximately pure water, but inasmuch as the converter has several times the capacity of the liquefier before the converter receives its ordinary charge the liquid passing into it will have its normal strength as a dextrine-and-acid mixture, and such will be the case also in all subsequent charges of the converter. As soon as the converter has received a sufficient charge the pump is stopped, and by the admission of steam into the converter the conversion of the dextrine into glucose takes place. By prolonging this step in the process the dextrine may be converted into pure dextrose sugar instead of into glucose.

I am aware that it has frequently been attempted to use sulfurous acid in the making of glucose or sugar from starch, but by the processes hitherto employed the acid has been injected into the starch-milk in the liquefier, and when the mixture of starch and acid has been heated the acid vaporizes—that is, forms sulfurous-acid gas in the top of the receptacle. The starch collects below and forms a paste. In practice, therefore, these processes have not been successful in producing complete liquefaction of the starch, since they have not provided for maintaining a complete mingling of the starch and acid during the process of liquefaction. Therefore the use of sulfurous acid in the making of sugar from starch has not hitherto been successful.

By using my process for liquefying starch in the manufacture of glucose and sugar I am enabled to use sulfurous acid, which when the conversion of the starch is completed immediately escapes from the mixture and saves the trouble of treating the glucose to remove the acid, saving quite a large expense that I am now subjected to, and at the same time making a better article.

What I claim, and desire to secure by Letters Patent, is—

The process of making glucose and sugar from starch which comprises first mixing starch-milk and sulfurous acid in a comparatively cold state, then forcing that mixture into a vessel filled with the heated liquid under pressure and sealed against the admission of air, continuing the heat to liquefy the starch, then passing the mixture into a converter which is heated and where the mixture is retained until it is sufficiently converted, and then removing the contents of the converter therefrom into a suitable receptacle.

CHARLES POPE.

Witnesses:
ALOYSIA HELMICH,
A. A. MURRAY.